US011681571B2

(12) United States Patent
Vajravel et al.

(10) Patent No.: US 11,681,571 B2
(45) Date of Patent: Jun. 20, 2023

(54) MANAGING DEVICE GROUP CONFIGURATIONS ACROSS WORKSPACES BASED ON CONTEXT

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/489,306

(22) Filed: Sep. 29, 2021

(65) Prior Publication Data

US 2023/0098066 A1    Mar. 30, 2023

(51) Int. Cl.
*G06F 9/04* (2006.01)
*G06F 9/54* (2006.01)
*G06F 9/445* (2018.01)

(52) U.S. Cl.
CPC .......... *G06F 9/543* (2013.01); *G06F 9/44505* (2013.01)

(58) Field of Classification Search
CPC ............................ G06F 9/543; G06F 9/44505
See application file for complete search history.

(56) References Cited

U.S. PATENT DOCUMENTS

| 2014/0052974 | A1* | 2/2014 | Masters | G01S 5/02 |
| | | | | 713/1 |
| 2014/0344420 | A1* | 11/2014 | Rjeili | G06Q 10/109 |
| | | | | 709/227 |
| 2017/0351476 | A1* | 12/2017 | Yoakum | G06F 3/0484 |
| 2019/0149405 | A1* | 5/2019 | Verma | H04L 41/0894 |
| | | | | 709/222 |
| 2020/0201521 | A1* | 6/2020 | Faulkner | G06F 3/0485 |
| 2020/0274835 | A1* | 8/2020 | McCue | H04L 51/48 |
| 2021/0133329 | A1* | 5/2021 | Andrews | G06F 9/45558 |

OTHER PUBLICATIONS

Lutz Schubert et al. ("Service-Oriented Operating Systems: Future Workspaces", (Year: 2009).*

* cited by examiner

*Primary Examiner* — Andy Ho
*Assistant Examiner* — Abdou K Seye
(74) *Attorney, Agent, or Firm* — Kirton McConkie; Brian Tucker

(57) ABSTRACT

Device group configurations can be managed across workspaces based on context. A service can be employed on each client computing device that a user may use in his or her workspaces. The service can be configured to determine when a profile applies to a workspace and can automatically apply a device group configuration to the workspace. The service can also monitor for context changes while a device group configuration is applied and can adjust the device group configuration based on the context changes.

16 Claims, 14 Drawing Sheets

App/Profile Table 401

| Application Type | Profile |
|---|---|
| Conferencing | Active_Listening |
| Productivity | Active_Creation |
| Hosted Meeting | Active_Engagement |
| Other | Quiescent |

Client Computing Device Information Table 402

MachineID = MachineID_1;
Hostname = Hostname_1;
System Capabilities : {System Turbo, DTT, Battery Info, ...};
Internal Devices : {webcam, mic, GPU, ...}
External Devices : {monitor(s), BT headset, eGPU, ...}
Installed Applications : {Zoom, AutoCAD, Visual Studio ...}
...

Profile/Dev-Group-Config Table 403

| Profile | Dev-Group-Config | Configurations |
|---|---|---|
| Active_Listening | Config_1 | Disable each webcam and mic<br>Enable speaker<br>Select monitor and section for video output |
| Active_Creation | Config_2 | Enable webcam, mic and speaker<br>Select monitor and section for video output<br>Disable other devices |
| Active_Engagement | Config_3 | Enable webcam, mic and external GPU<br>Select monitor and section for video output<br>Disable other devices |
| Quiescent | Config_4 | Disable all audio and video input devices<br>Disable turbo |

FIG. 4A

Workspace Table 404

| User ID | Workspace ID | Description | Details |
|---|---|---|---|
| User_1 | WorkspaceID_1 | Home Office | [System Capabilities] [Attached Devices] |
| | WorkspaceID_2 | Work Office | [System Capabilities] [Attached Devices] |
| User_2 | | ... | |

Context Action Table 405

| Context | Event | Action |
|---|---|---|
| System | AC to DC | If RSoC > 70% & PD-battery, enable higher discharge C-Rate |
| | DC & RSoC < 70% | Set lower discharge C-Rate<br>Reduce PLx levels for applications |
| | | ... |
| User | User in far field | Reduce each monitor's refresh rate and brightness |
| | User in near field | Set primary monitor to higher refresh rate |
| | | ... |

*FIG. 4B*

MANAGING DEVICE GROUP CONFIGURATIONS ACROSS WORKSPACES BASED ON CONTEXT

CROSS-REFERENCE TO RELATED APPLICATIONS

N/A

BACKGROUND

A user may oftentimes use his or her client computing device in a workspace. In this context, a workspace can be viewed as an environment that includes a client computing device and one or more devices to which the client computing device may be connected. Such devices may commonly include external displays, a keyboard, a mouse, etc. A user oftentimes has or uses a workspace at the office and a workspace at home, and such workspaces may include the same client computing device (e.g., the user's laptop).

FIG. 1 provides an example of a workspace 100. As shown, workspace 100 includes client computing device 110 and various devices including a headset 111, a webcam 112, an external monitor 113, a large format display 114, a pen 115, a dock 116, a speakerphone 117, a keyboard 118, a mouse 119 and a sound bar 120, among possibly other devices. Client computing device 110 could be connected to these devices in any available way.

Each device in workspace 100 could provide a variety of functionality that client computing device 110 can leverage. For example, headset 111, webcam 112, external monitor 113, large format display 114, speakerphone 117, keyboard 118 and sound bar 120 could all include a microphone in addition to client computing device 100's internal microphone. As another example, webcam 112, external monitor 113 and large format display 114 could include a camera in addition to client computing device 100's internal camera. As a further example, headset 111, external monitor 113, large format display 114, speakerphone 117, keyboard 118 and sound bar 120 could each include a speaker in addition to client computing device 100's internal speaker.

Workspace 100 allows the user to customize his or her experience for any given scenario, such as by selecting which devices/device functionality may be enabled or disabled, which applications may be available and/or displayed, whether notifications may be allowed, etc. At the same time, however, the variety and customizability of functionality in workspace 100 makes it difficult for the user to make such customizations. For example, although some applications and devices allow customizations, making customizations is typically a manual process and is performed in an isolated manner.

As one example, a user may use Zoom on his work laptop in his home office to attend a staff meeting. In such a case, the user may desire to disable all connected webcams and microphones and connect a Bluetooth headset to use it to listen to the meeting. The user may also want to place Zoom on a primary monitor to fill half the screen and put other monitors in low power mode. To save battery life, the user may also want to reduce the frames-per-second from 60 to 30 during the meeting and reduce screen brightness when the user is detected in the far field. Although the user could likely accomplish this manually in a step-by-step manner, it would be a very tedious process and may be beyond the capabilities of a non-technical user.

As another example, a user may use Zoom on his work laptop in his work office to collaborate while using AutoCAD. In such a case, the user may desire to place AutoCAD on the primary monitor and enable system turbo for it. The user may also desire to pair a Bluetooth headset to use its microphone and speakers for Zoom. Also, when the laptop is running on battery, the user may want to also enable battery turbo if the battery charge is over 60%, but may want to disable system turbo and battery turbo if the battery charge drops below 60%. Again, although the user could likely accomplish this manually in a step-by-step manner, it would be a very tedious process and may be beyond the capabilities of a non-technical user.

BRIEF SUMMARY

The present invention extends to systems, methods and computer program products for managing device group configurations across workspaces based on context. A service can be employed on each client computing device that a user may use in his or her workspaces. The service can be configured to determine when a profile applies to a workspace and can automatically apply a device group configuration to the workspace. The service can also monitor for context changes while a device group configuration is applied and can adjust the device group configuration based on the context changes.

In some embodiments, the present invention may be implemented as a method for managing device group configurations across workspaces based on context. A service can detect that a first application is running on a first client computing device that is part of a first workspace. The service can determine that the first application is associated with a first profile. The service can identify a first device group configuration that is associated with the first profile. The service can then apply the first device group configuration to customize the first workspace.

In some embodiments, the present invention may be implemented as computer storage media storing computer executable instructions which when executed implement a method for managing device group configurations across workspaces based on context. A service executing on a first client computing device in a first workspace can receive, from a management server, a first data structure that associates profiles with applications and a second data structure that associates the profiles with device group configurations that are customized for the first workspace. When a first application is loaded on the first client computing device in the first workspace, the service can access the first data structure to identify a first profile that is associated with the first application. The service can also access the second data structure to identify a first device group configuration that is associated with the first profile. The service can then apply the first device group configuration to customize the first workspace.

In some embodiments, the present invention may be implemented as a client computing device that includes one or more processors and computer storage media storing computer executable instruction which when executed implement a service that is configured to manage device group configurations across workspaces based on context. The service can detect when an application is loaded in a workspace. When the application is loaded in the workspace, the service can identify a profile for the application. The service can also identify a device group configuration that is associated with the profile and customized for the workspace. The service can then cause the device group configuration to be implemented in the workspace.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 4A and 4B provide examples of various data structures that may be used in one or more embodiments of the present invention;

DETAILED DESCRIPTION

In this specification and the claims, the term "client computing device" should be construed as encompassing any computing device that an individual may personally use such as a desktop, laptop, tablet, smart phone, etc. The term "device" should be distinguished from "client computing device" in that a device may be used by a client computing device to provide some type of input or output functionality. A device may be internal or external to a client computing device. The term "workspace" should be construed as an environment that includes a client computing device and one or more devices to which the client computing device is connected, whether wired or wireless. Although embodiments of the present invention are described primarily in the context of a Windows-based implementation, the present invention could be implemented in any operating system environment that supports the described functionality.

Figure 1:
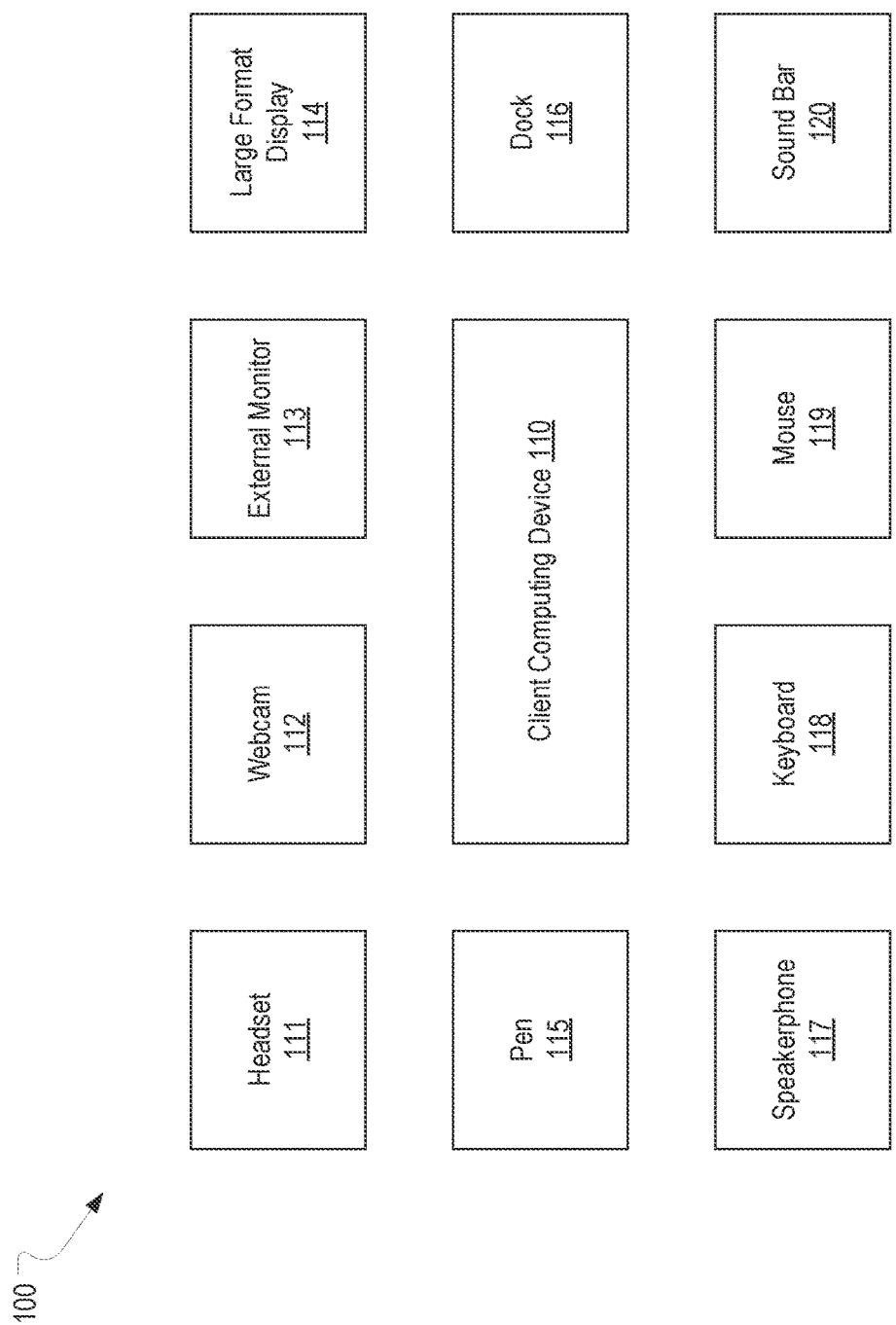
FIG. 1 provides an example of a workspace.
Figure 2:
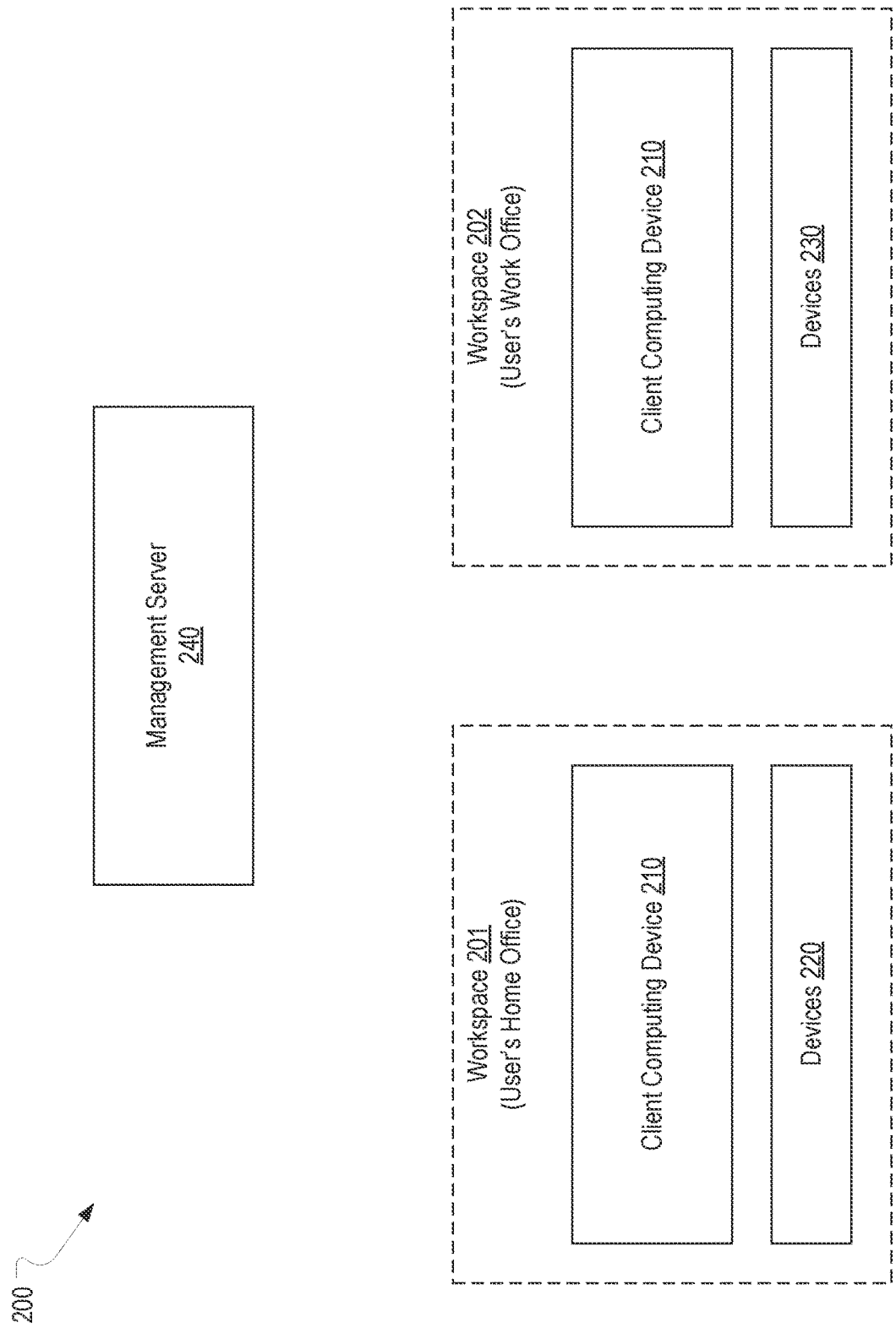
FIG. 2 provides an example of a computing environment that includes multiple workspaces in which one or more embodiments of the present invention may be implemented.

FIG. 2 provides an example of a computing environment 200 in which embodiments of the present invention may be implemented. Computing environment 200 includes two workspaces 201 and 202 that a user may use. Workspace 201 is assumed to be the user's home office in which he uses his client computing device 210 with a set of devices 220. Workspace 202 is assumed to be the user's work office in which he also uses his client computing device 210 with a set of devices 230. In other examples, the user could use a different client computing device in each workspace 201 and 202. The user could also use more than two workspaces. Furthermore, devices 220 and devices 230 could include one or more devices in common such as when the user uses the same Bluetooth headset at home and at work. Accordingly, embodiments of the present invention should not be limited to any number of workspaces or to any arrangement of devices that may be used in a workspace. Computing environment 200 may also include a management server 240 which can represent any component accessible to client computing device 210 when in workspaces 201 and 202.

Figure 3:
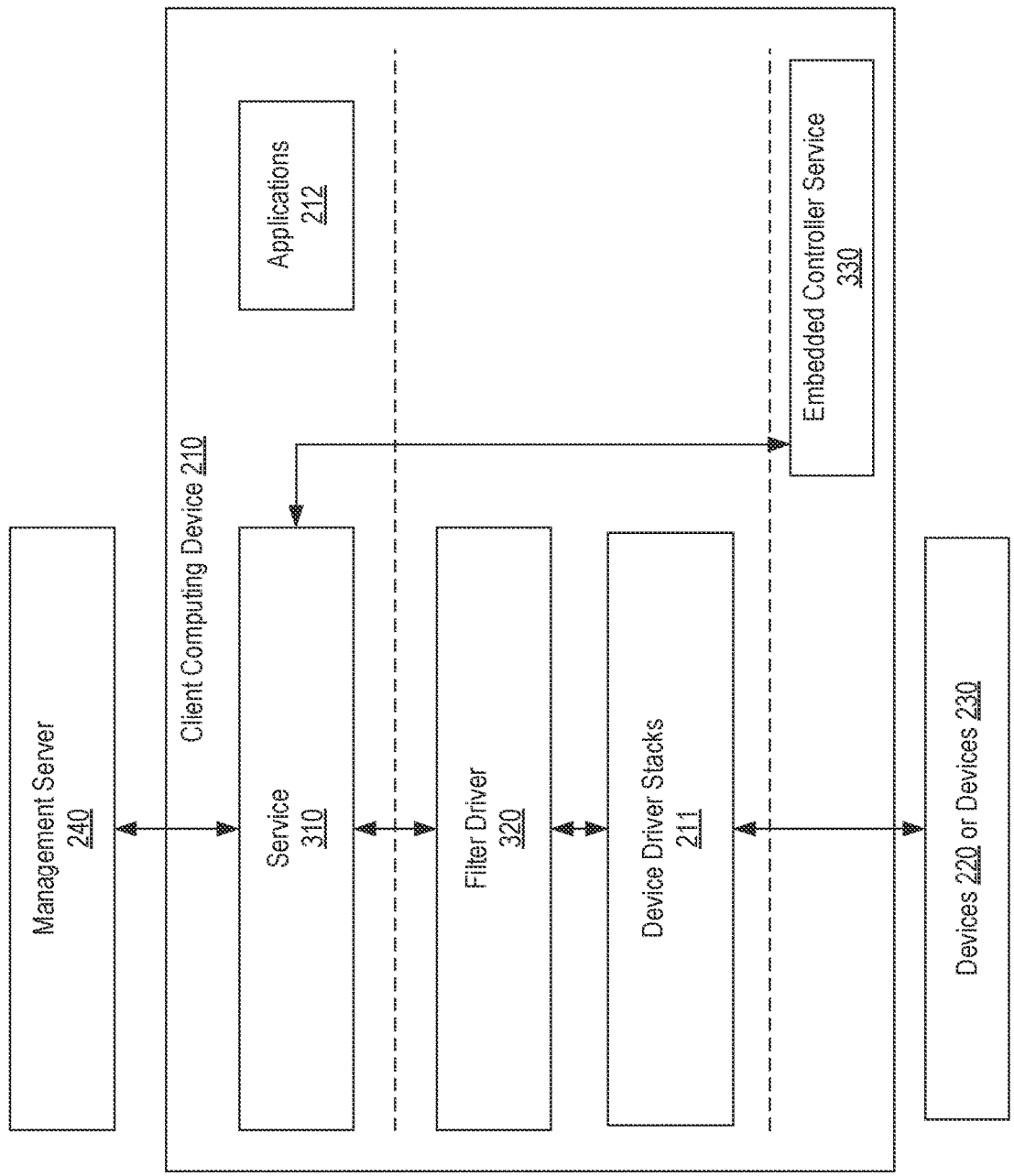
FIG. 3 provides an example of how a client computing device may be configured in one or more embodiments of the present invention.

FIG. 3 provides an example of how client computing device 210 may be configured to enable one or more embodiments of the present invention to be implemented. Notably, if the user uses different client computing devices in workspaces 201 and 202, each client computing device could be configured as shown in FIG. 3.

Client computing device 210 may include device driver stacks 211 which are loaded for devices 220 or devices 230. For example, device driver stacks 211 could include a device stack for any connected monitor, keyboard, mouse, Bluetooth headset, webcam, etc. Client computing device 210 may also include applications 212 which could include collaboration applications such as Zoom Teams, WebEx, etc., productivity applications such as AutoCAD, Visual Studio Code, Power Point, etc., and any other application that may be managed as part of embodiments of the present invention.

In accordance with embodiments of the present invention, client computing device 210 can also include a service 310, which may be a user mode component that may be capable of running in Modern-Standby states in some embodiments, a filter driver (or multiple filter drivers) 320 that may be loaded on device driver stacks 211 and an embedded controller (EC) service 330. Service 310 may be configured to communicate with management server 240 (e.g., via a network protocol), with filter driver 320 (e.g., via IOCTLs) and with EC service 330 (e.g., via WMI/ACPI).

As an overview, service 310 can be configured to monitor for context when client computing device 210 is in a workspace, such as workspace 201 or workspace 202, and can manage device group configurations for the workspace based on such context. Service 310 can interface with management server 240 to obtain configuration policies that it may use to implement this management. Service 310 may also interface with filter driver 320, EC service 330 and the operating system (not shown) to implement this management.

FIGS. 4A and 4B provide examples of various data structures that may be employed in embodiments of the present invention to manage device group configurations across workspaces based on context. An app/profile table 401, which may be maintained by management server 240 and provided to service 310, can define profiles for application types or possibly for specific applications. Service 310 may use app/profile table 401 to determine which profile should apply to client computing device 210 based on application context. For example, in FIG. 4A, app/profile table 401 defines a profile of Active_Listening for conferencing applications, a profile of Active_Creation for productivity applications, a profile of Active_Engagement for a hosted meeting and a profile of Quiescent for other applications.

A client computing device information table 402 may be compiled by service 310 and may define a variety of information for client computing device 210 such as a machine ID, a hostname, system capabilities, internal and external devices, installed applications, etc. Service 310 may share table 402 with management service 240.

A profile/dev-group-config table 403, which may be maintained by management server 240 and provided to service 310, can associate each profile with a device group configuration. In this context, a device group configuration can represent a set of configurations for a group of devices (e.g., devices 220 or devices 230) and possibly for client computing device 210 itself (e.g., based on its system capabilities). For example, table 403 associates the Active_Listening profile with the device group configuration Config_1 which includes generalized configurations of "disable each webcam and mic," "enable speaker," and "select monitor and section for video output." As described in detail below, service 310 can use table 403 to determine which device group configuration should be automatically applied when a profile is determined to apply to client computing device 210.

Workspace table 404, which may be maintained by management server 240, can associate each user with each workspace that he or she uses. For example, workspace table 404 associates User_1, who is assumed to be the user of client computing device 210, with WorkspaceID_1 and WorkspaceID_2, which are assumed to be workspaces 201 and 202 respectively. Workspace table 404 can also include a description for each workspace (e.g., home office and work office) and details of each workspace (e.g., the system capabilities and the attached devices which management server 240 can receive from service 310). To ensure that the workspace ID is unique even when the same client computing device is used in multiple workspaces, the workspace ID could be a hash of the machine ID of the client computing device and identifiers of the devices attached to the client computing device. For example, WorkspaceID_1 could be the hash of MachineID_1 and identifiers of devices 220 while WorkspaceID_2 could be the hash of MachineID_1 and identifiers of devices 230.

Context action table 405, which may be maintained by management server 240, can define actions to be taken based on context, such as system context or user context, to adjust a currently applied device group configuration. For example, in the system context, when a client computing device switches from AC power to DC power, a higher discharge C-Rate may be enabled if the RSoC (or remaining battery charge) is greater than 70% and the battery is Power Delivery (PD) capable. As another example, in the user context, when the user is in the far field, each monitor's refresh rate and brightness may be reduced. Context action table 405 can define many different actions that should be taken based on a particular context and not all actions/contexts may be applicable to each client computing device. Accordingly, in some embodiments, management server 240 may share with service 310 only portions of context action table 405 that are applicable to current workspace.

In some embodiments, management server 240 and/or service 310 could rely on machine learning techniques rather than or in addition to one or more of tables 401, 403 and 405 to manage device group configurations across workspaces based on context. For example, management server 240 could learn a user's or users' preferences when using a conferencing application and could create/refine a device group configuration accordingly.

Figure 5A:
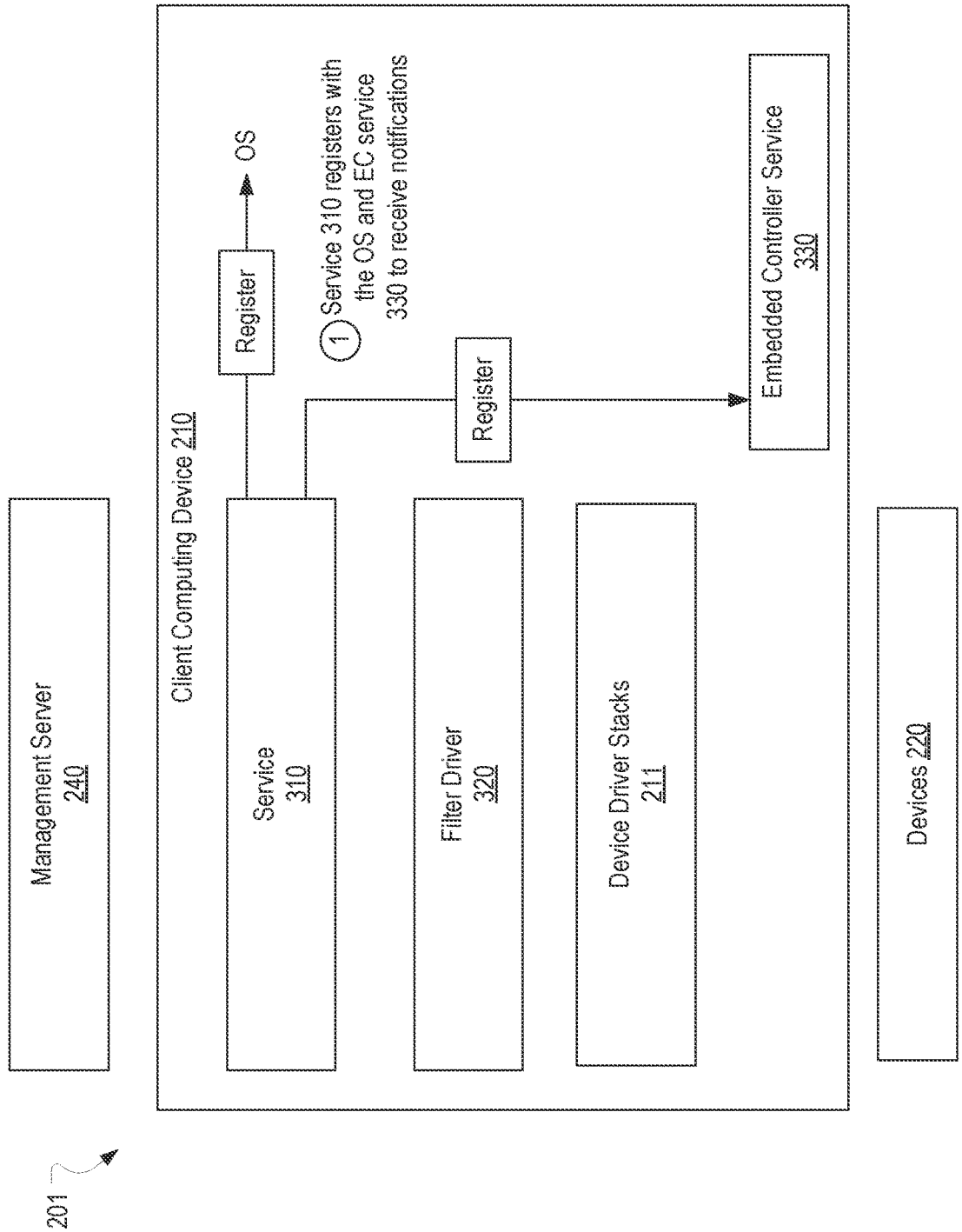
FIGS. 5A-5C provide an example of initial functionality that may be performed as part of managing device group configurations across workspaces based on context in accordance with one or more embodiments of the present invention.
Figure 5B:
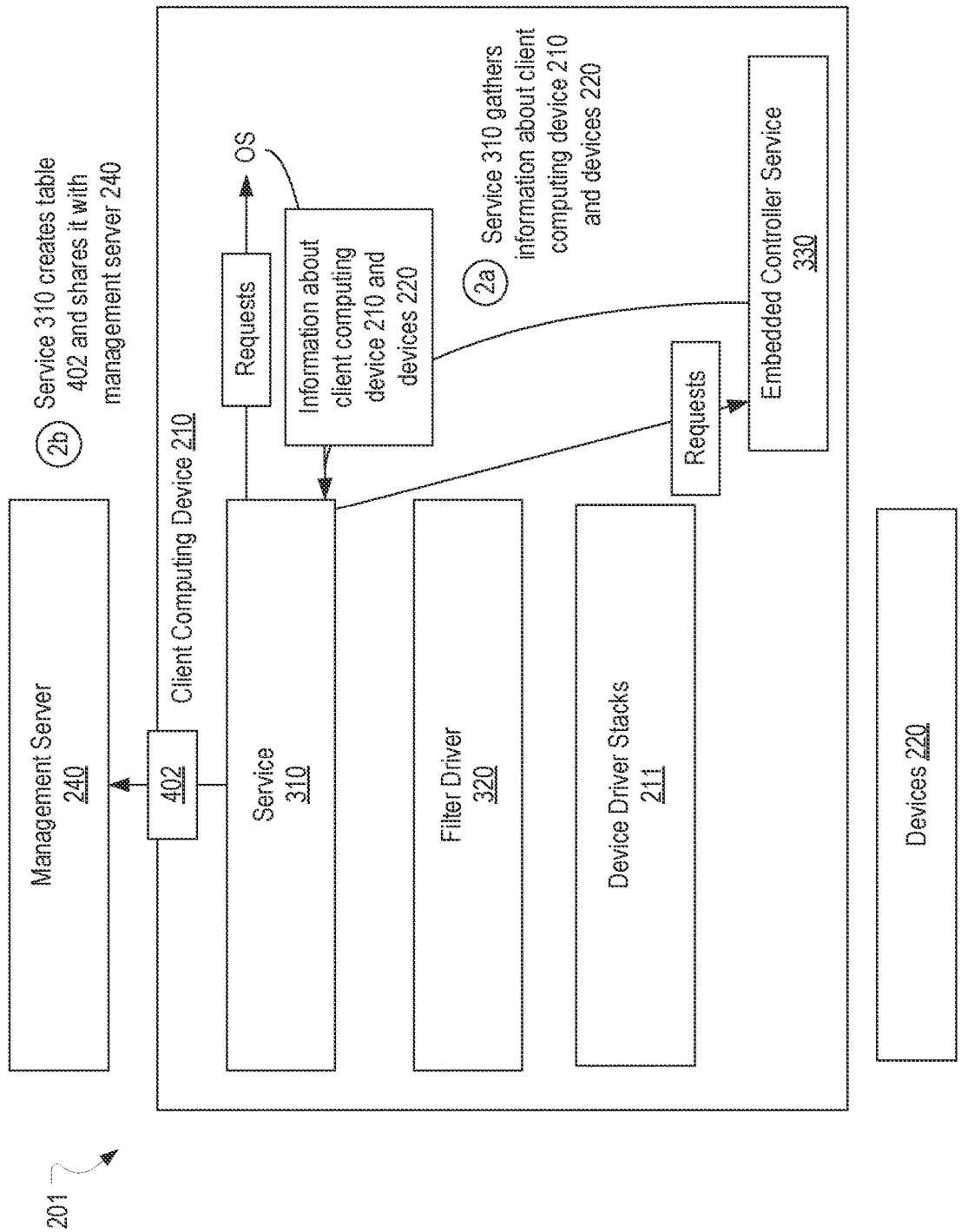
Figure 5C:
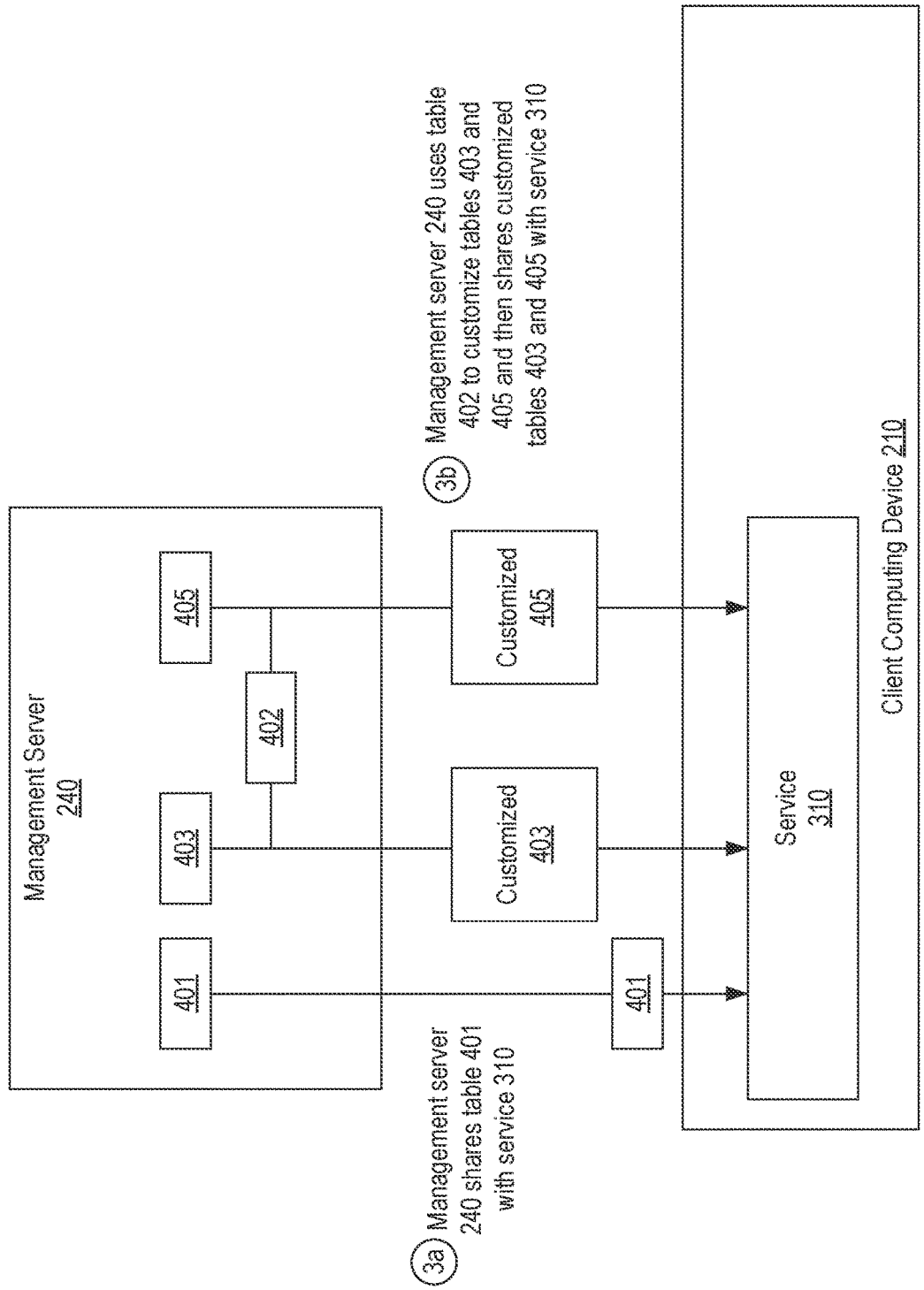

FIGS. 5A-5C provide an example of functionality that service 310 and management server 240 can initially perform to enable device group configurations to be managed across workspaces based on context. In FIG. 5A, it is assumed that client computing device 210 is in workspace 201 (e.g., the user's home office) and that devices 220 are connected to client computing device 210. It is noted that devices 220 could represent internal and external devices. It is also assumed that device driver stacks 211 have been loaded for devices 220, that filter driver 320 has been loaded on device driver stacks 211, that service 310 has been loaded and that embedded controller service 330 is running at the BIOS level. It is further assumed that service 310 has established mechanisms for communicating with management server 240, filter driver 320 and embedded controller service 330.

As part of its initialization, in step 1, service 310 can register with the operating system (OS) and embedded controller service 330 to receive notifications. For example, service 310 can register with the OS to be notified whenever an application is loaded, suspended, unloaded, etc., to be notified of network state changes (e.g., when client computing device 210 connects to or disconnects from a network), to be notified when a device is added or removed, etc. Service 310 can register with EC service 330 to be notified of system events (e.g., events relating to the battery RSoC, C-Rate, adapter input power rate, etc.).

Turning to FIG. 5B, in step 2a, service 310 can gather information about client computing device 210 and devices 220. For example, service 310 may enumerate devices 220, query the OS to identify installed applications, system identifiers (e.g., the machine ID and hostname), system capabilities, etc. and query EC service 330 for other system capabilities. In short, step 2a can entail gathering any information necessary for populating/updating table 402. Then, in step 2b, service 310 can create/update table 402 and share it with management server 240.

Turning to FIG. 5C, in step 3a, management server 240 may share table 401 with service 310. Also, in step 3b, management server 240 may use table 402 to customize tables 403 and 405 and then share the customized tables 403 and 405 with service 310. Table 403 may be customized so that the device group configurations define configurations that are relevant to devices 220 and the system capabilities of client computing device 210. For example, if client computing device 210 does not support turbo, any action for enabling or disabling turbo could be removed from any device group configuration in the customized table 403. Similar customizations could be made to table 405 to ensure that only relevant events and actions are included. However, in some embodiments, management server 240 may not customize table 403 or table 405 but service 310 may instead handle such customizations or selective application of the tables. If any changes in devices 220 occur (e.g., due to any devices being connected or disconnected or due to the user specifying that any of devices 220 should or should not be considered), service 310 can update table 402 and share it with management service 240 which in turn can update table 404 and send back new/updated tables 403 and 405.

Accordingly, at this point, service 310 will maintain table 401 which it may use to determine which profile should apply at any given time, will maintain table 403 which it may use to determine which device group configuration should be applied when a profile is selected and will maintain table 405 which it may use to determine actions to take to adjust a currently applied device group configuration in response to changes in context. Also, because service 310 has registered for notifications, it can be notified of events that may represent a change in context that dictates that a different profile should be applied and therefore that a different device group configuration should be applied. Similarly, service 310 can be notified of events that may represent a change in context that dictates that adjustments should be made to the currently applied device group configuration.

Figure 6A:
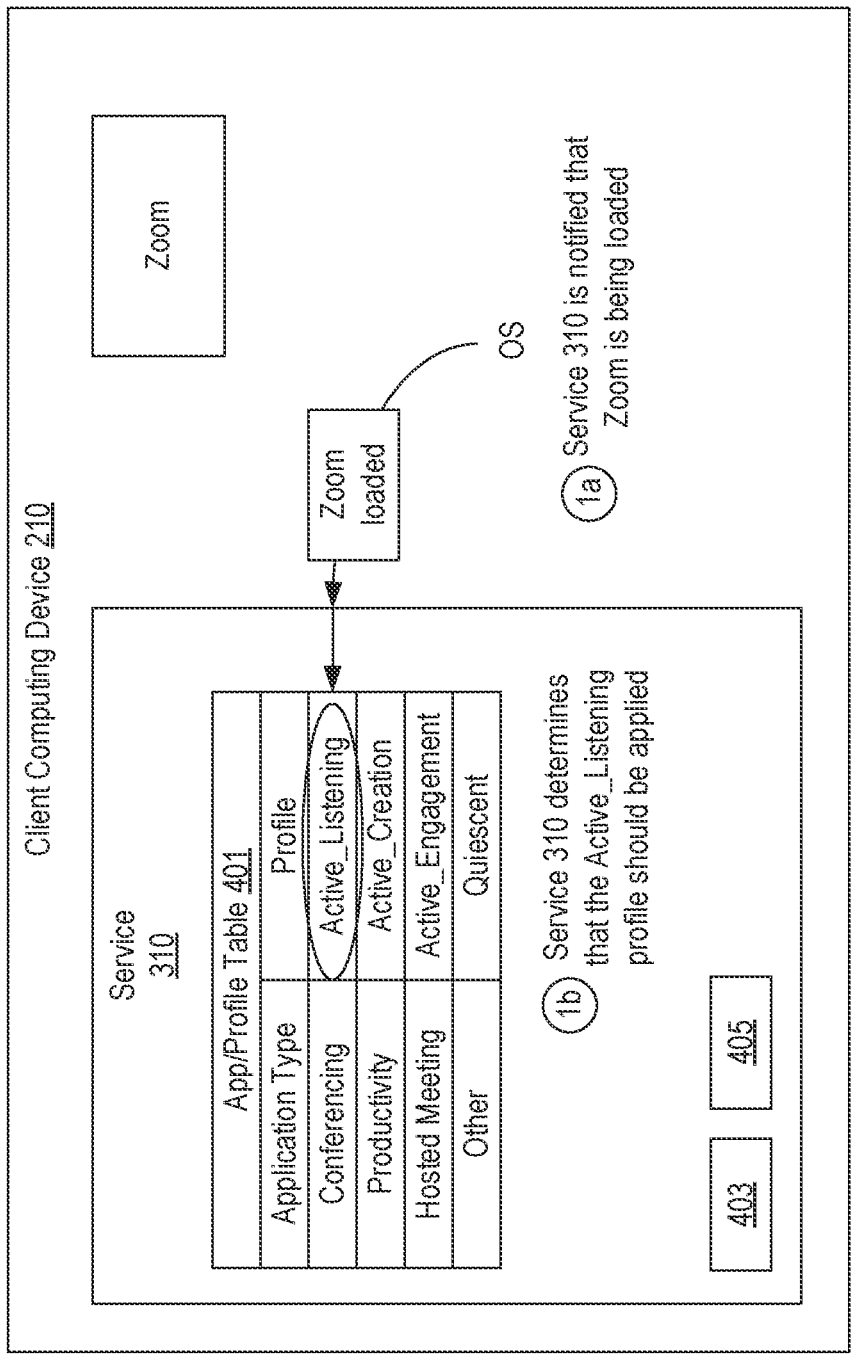
FIGS. 6A-6F provide an example of how device group configurations can be managed across workspaces based on context in accordance with one or more embodiments of the present invention.

FIGS. 6A-6F provide an example of how service 310 can manage device group configurations across workspaces based on context. In FIG. 6A, it is assumed that Zoom is being loaded on client computing device 210. Then, in step 1*a*, service 310 can be notified that Zoom is being loaded. Upon receiving the notification, in step 1*b*, service 310 can determine that the Active_Listening profile should be applied. For example, service 310 can be configured to respond to application load notifications by identifying which application is being loaded and identifying a matching entry in app/profile table 401, which in this case could be the entry for the conferencing application type which is associated with the Active_Listening profile.

Notably, service 310 could use different criteria to determine the matching entry in app/profile table 401 when an application is loaded. For example, in some embodiments, the matching entry could be determined based on the identity of the loaded application alone. However, in other embodiments, the matching entry could be determined based on a context of the loaded application. For example, service 310 could use an extension or API of an application to obtain additional context about how the user is using the application. As one example, service 310 could use the Zoom SDK to determine whether the user is the host of the meeting. As another example, service 310 could use a StreamPlayer API to determine if a user has paused a stream of a gaming application.

Figure 6B:
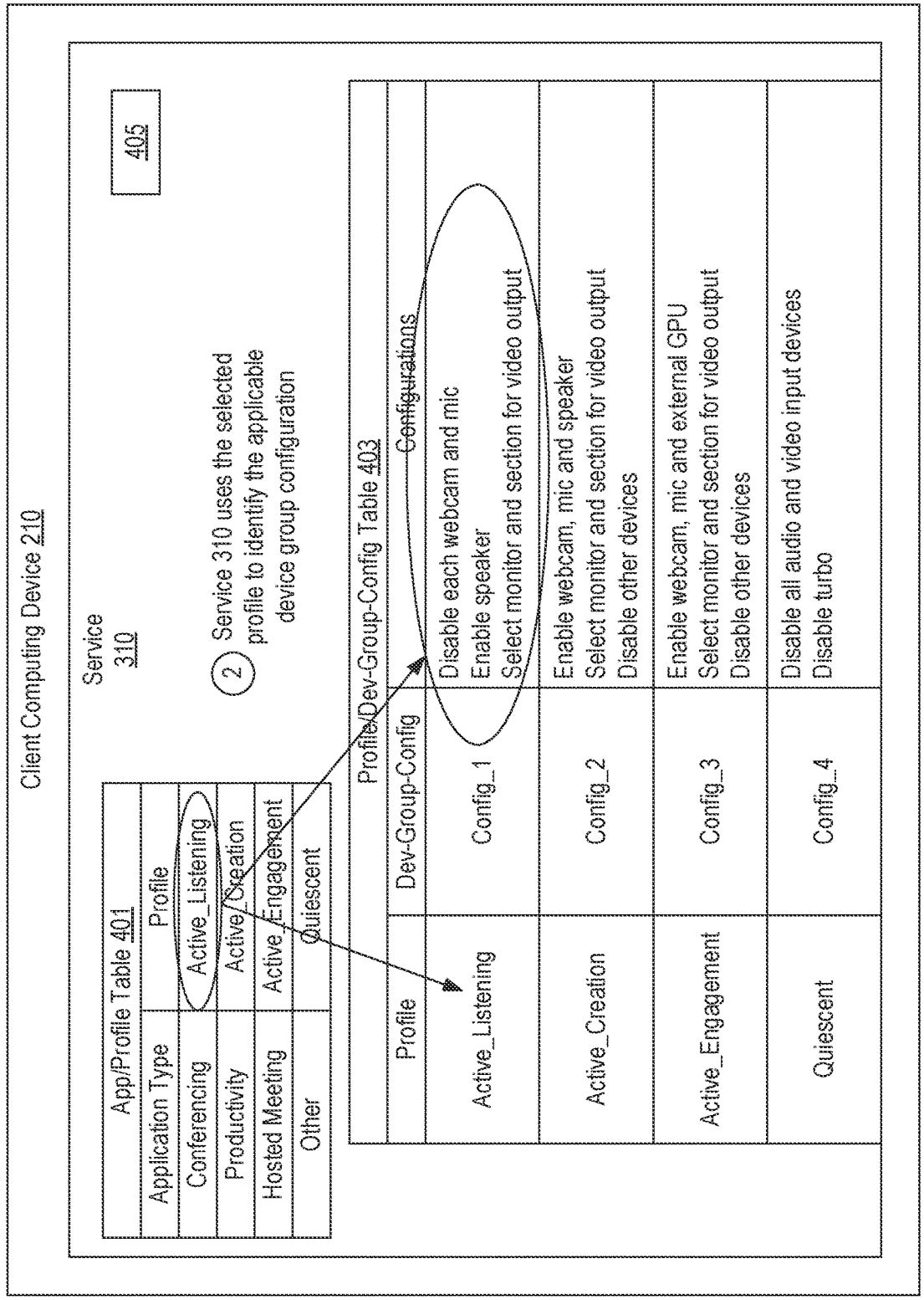

Turning to FIG. 6B, in step 2, service 310 can use the selected profile, Active_Listening, to access profile/dev-group-config table 403 to identify the device group configuration for the profile, which in this case would be Config_1. Step 2 can entail identifying each configuration that should be applied to cause the device group configuration to be implemented on client computing device 210. In the depicted example, this could include determining that Config_1 requires that each webcam and microphone be disabled, that a speaker be enabled, that a monitor should be selected and that a section of the selected monitor should be selected to display Zoom's window.

Figure 6C:
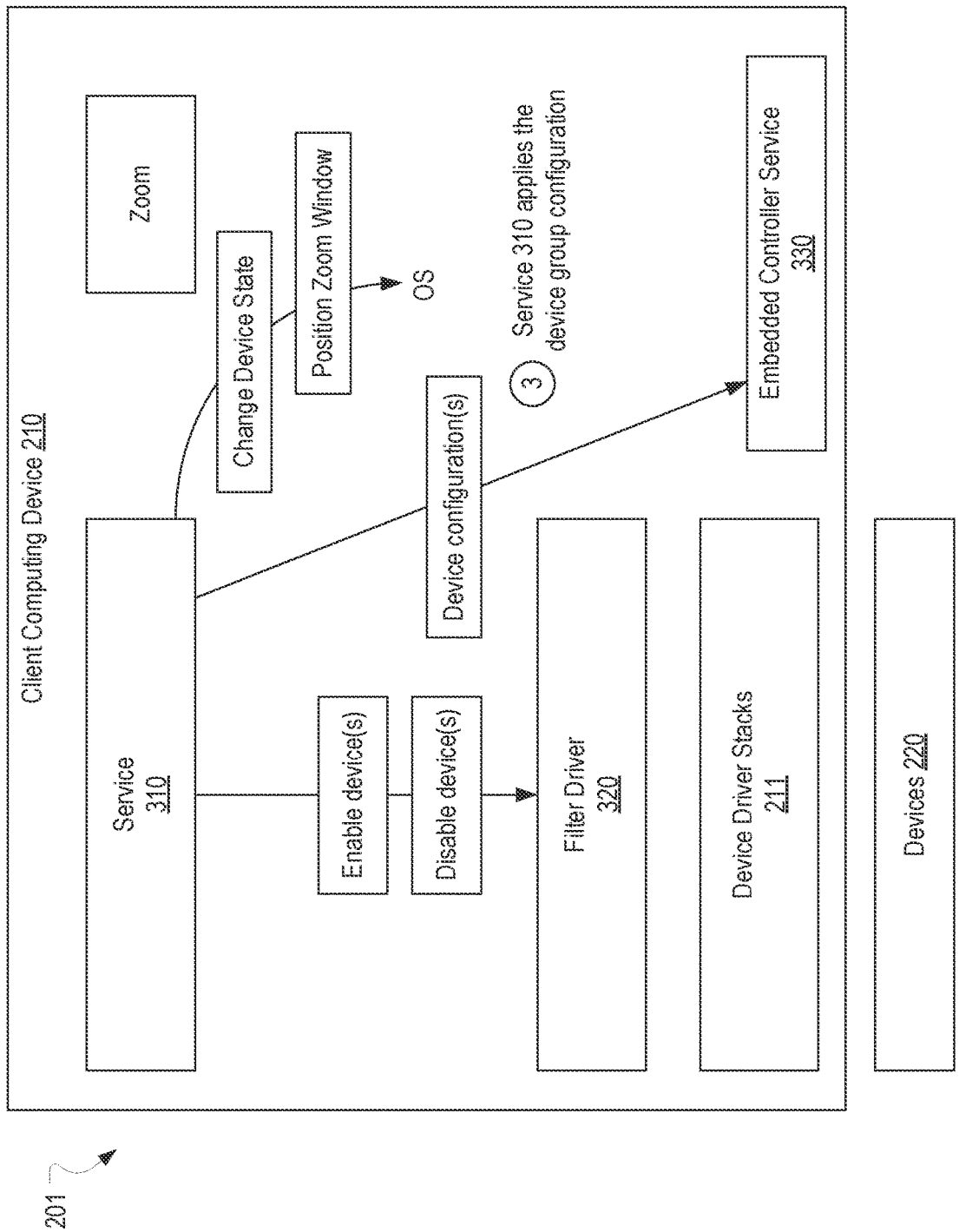

Turning to FIG. 6C, in step 3, service 310 can apply the selected device group configuration. For example, to apply one or more configurations in the device group configuration, service 310 could interface with the operating system such as to position the window of the application (e.g., using the SetWindowPos function in Windows-based implementations) or to change a configuration or state of one or more of devices 220 (e.g., using the SetupDiChangeState function in Windows-based implementations). Additionally or alternatively, to apply one or more configurations in the device group configuration, service 310 could interface with filter driver 320 such as to enable or disable one or more of devices 220 (e.g., by causing filter driver 320 to re-enumerate the device(s) and then change a hardware ID via IRP_MN_QUERYID::BusQueryHardwareIDs). Additionally or alternatively, service 310 could interface with EC service 330 to change a configuration or state of one or more of devices 220 (e.g., by opening or closing an automatic shutter of a webcam or microphone). Accordingly, the functionality that service 310 performs or causes to be performed in step 3 will vary based on the configurations defined in the device group configuration and the available mechanisms for changing such configurations.

After step 3 is performed, workspace 201 will be configured in accordance with the applicable device group configuration. Notably, because table 403 is customized for the particular workspace, the device group configuration that is applied for any given profile will be customized for the particular workspace. Therefore, if the user were to load Zoom in workspace 202 (the user's work office workspace), the device group configuration that would be applied would likely differ from the device group configuration that would be applied when Zoom is loaded in workspace 201 (the user's home office workspace).

Figure 6D:
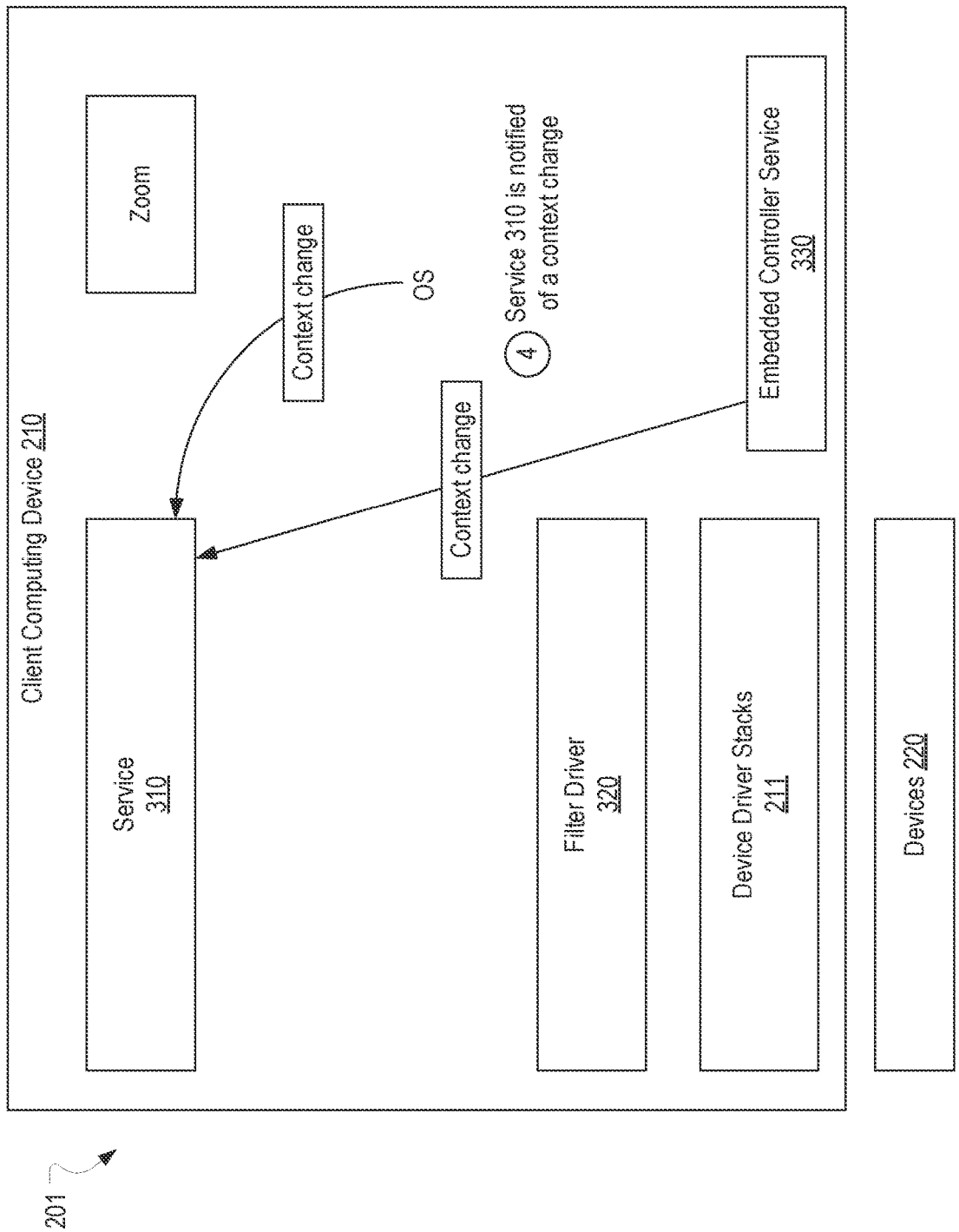

Turning to FIG. 6D, it is assumed that the user is still participating in a Zoom meeting and that the device group configuration for the Active_Listening profile remains applied. Then, in step 4, service 310 is notified of a context change. As shown, this notification could be generated by the operating system, EC service 330 or possibly another component. For example, when the battery RSoC drops below a threshold, EC service 330 may notify service 310. As another example, if the user moves from the near field to the far field, the OS or a proximity detector service could notify service 310. Accordingly, step 4*a* could represent a variety of scenarios where context has changed and a variety of ways in which service 310 may be notified of such changes.

Figure 6E:
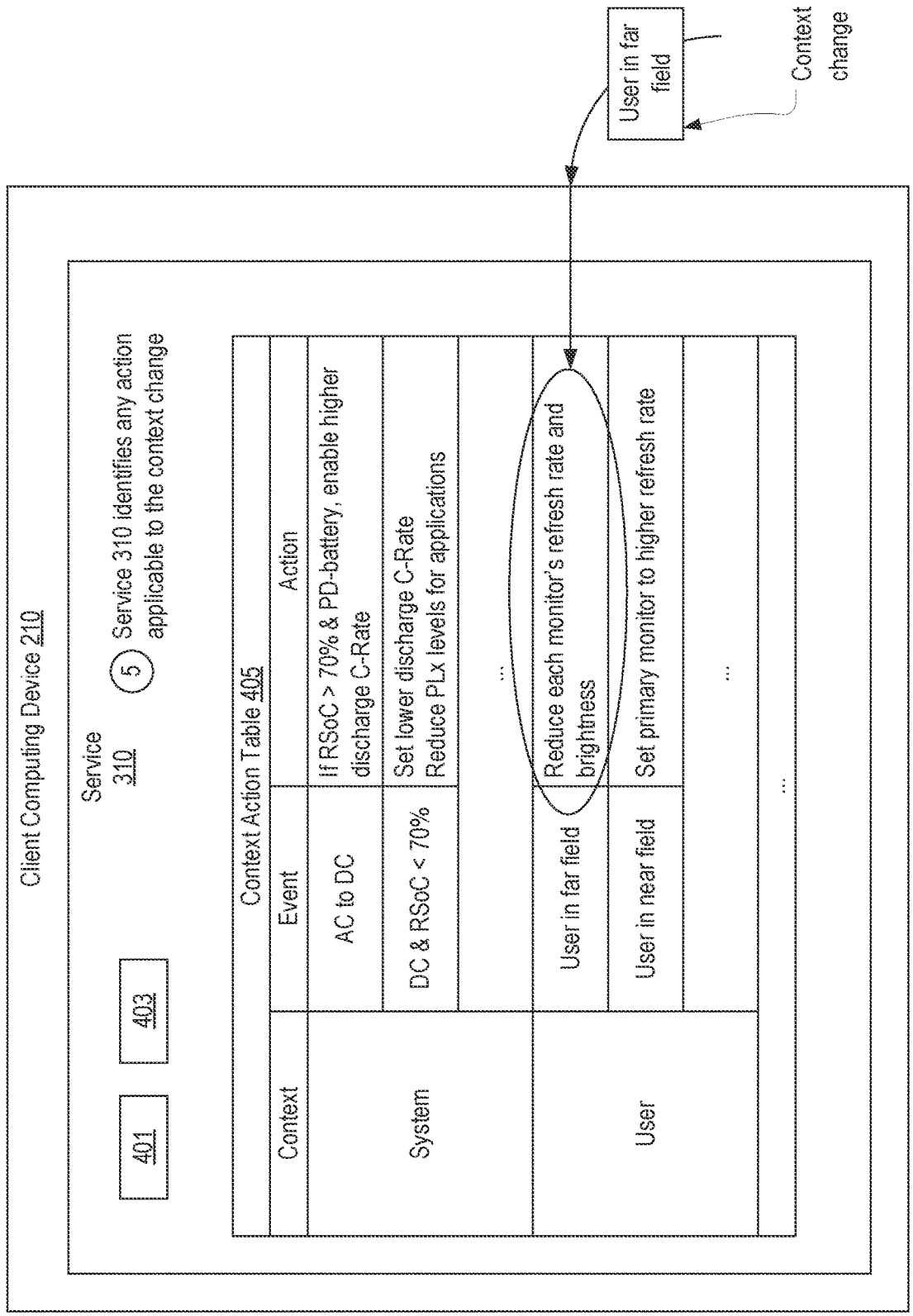

Turning to FIG. 6E, in response to the notification of the context change, in step 5, service 310 can identify any action that is applicable to the context change. For example, assuming the context change is a change in the user's presence from the near field to the far field, service 310 could access context action table 405 to determine that each monitor's refresh rate and brightness should be reduced.

Figure 6F:
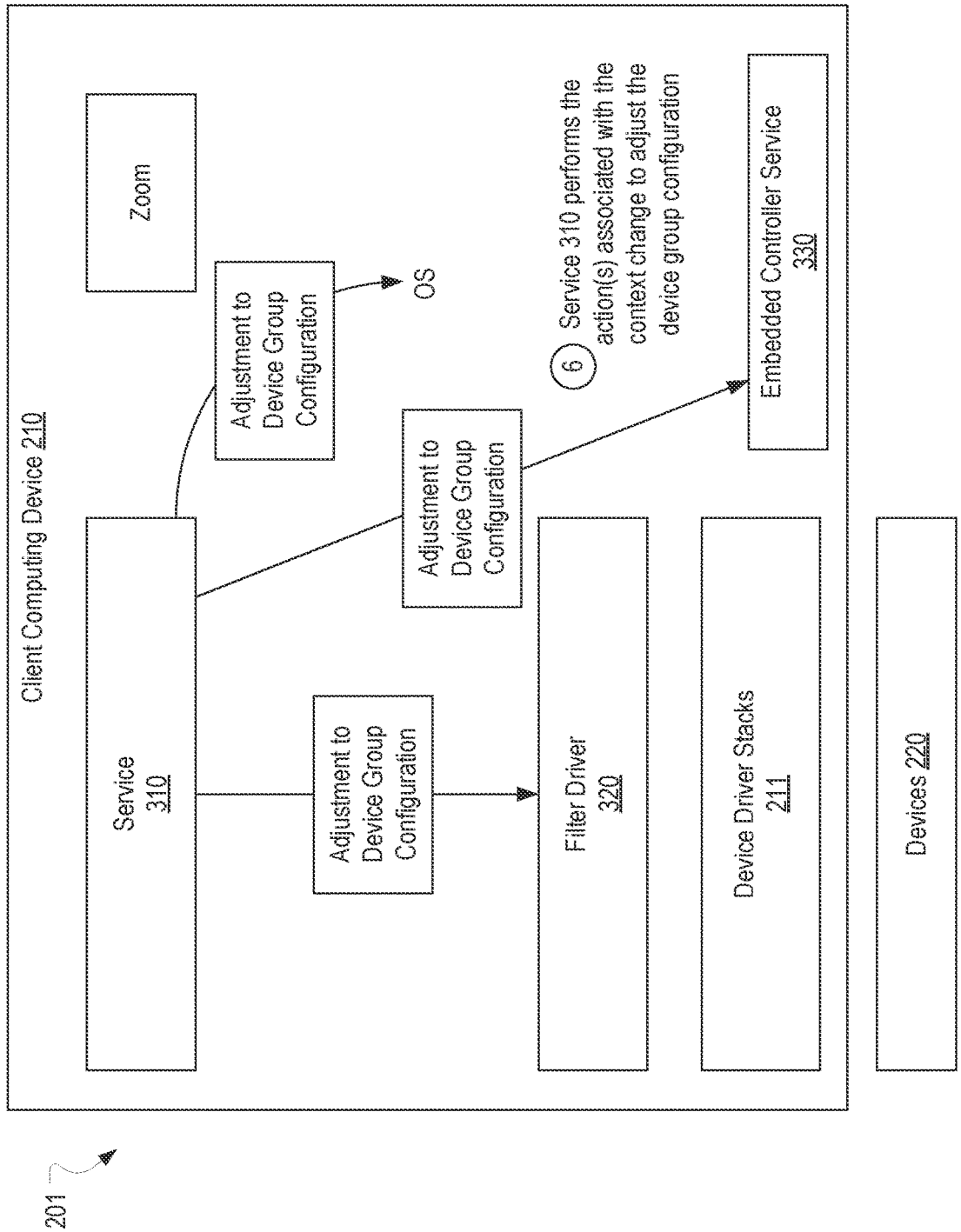

Turning to FIG. 6F, in step 6, service 310 can perform, or caused to be performed, each action associated with the context change to thereby adjust the currently applied device group configuration. Again, service 310 could interface with filter driver 320, EC service 330, the OS, and/or any other suitable component to perform the action. For example, to reduce the brightness and refresh rate of each monitor in devices 220, service 310 could interface with the OS (e.g., using the ChangeDisplaySettingsA function). As another example, to change a battery setting, service 310 could interface with EC service 330.

In summary, embodiments of the present invention can be implemented to manage device group configurations based on context across multiple workspaces that a user may use even if the user uses the same client computing device in the multiple workspaces. By managing device group configurations, the workspace can be automatically configured for a particular scenario thereby freeing the user from having to perform a manual, step-by-step configuration process.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. A method for managing device group configurations across workspaces based on context, the method comprising:
    gathering, by a service, information about a first workspace, the first workspace including a first client computing device on which the service runs and a first set of devices to which the first client computing device is currently connected, the information about the first workspace including an identifier of the first workspace;
    sending, by the service, the information about the first workspace to a management server;
    receiving, by the service, a first instance of a first data structure that associates profiles with device group configurations, the first instance of the first data structure being customized by the management server based on the information about the first workspace the service sent to the management server;
    detecting that a first application is running on the first client computing device while the first client computing device is part of the first workspace;
    determining that the first application is associated with a first profile defined in the first instance of the first data structure;
    identifying a first device group configuration that is associated with the first profile in the first instance of the first data structure;
    applying the first device group configuration to customize the first workspace;
    subsequently gathering, by the service, information about a second workspace, the second workspace including the first client computing device on which the service runs and a second set of devices to which the first client computing device is currently connected, the information about the second workspace including an identifier of the second workspace;
    sending, by the service, the information about the second workspace to the management server;
    receiving, by the service, a second instance of the first data structure that is customized by the management server based on the information about the second workspace the service sent to the management server;
    detecting that the first application is running on the first client computing device while the first client computing device is part of the second workspace;
    determining that the first application is associated with the first profile defined in the second instance of the first data structure;
    identifying a second device group configuration that is associated with the first profile in the second instance of the first data structure; and
    applying the second device group configuration to customize the second workspace.

2. The method of claim 1, wherein detecting that the first application is running on the first client computing device comprises receiving a notification that the first application is being loaded.

3. The method of claim 1, wherein determining that the first application is associated with the first profile comprises accessing a second data structure that associates profiles with applications or application types.

4. The method of claim 1, wherein applying the first device group configuration to customize the first workspace comprises:
    enabling or disabling one or more of the first set of devices of the first workspace;
    adjusting a configuration of one or more of the first set of devices of the first workspace; or
    adjusting how the first application is displayed.

5. The method of claim 1, further comprising:
    detecting a context change in the first workspace;
    identifying one or more actions associated with the context change; and
    causing the one or more actions to be performed in the first workspace to thereby adjust the first device group configuration.

6. The method of claim 5, wherein the context change is a change in system context or a change in user context.

7. The method of claim 1, wherein applying the first device group configuration to customize the first workspace comprises interfacing with one or more of:
    a filter driver;
    an embedded controller service; or
    an operating system.

8. The method of claim 1, further comprising:
    detecting that a second application is running on the first client computing device when the first device group configuration is applied to customize first workspace;
    determining that the second application is associated with a second profile defined in the first instance of the first data structure;
    identifying a second device group configuration that is associated with the second profile in the first instance of the first data structure; and
    applying the second device group configuration to customize the first workspace.

9. The method of claim 1, wherein the first workspace is one of multiple workspaces associated with a user, the method further comprising:
- detecting that the first application is running on a second client computing device when the user is using the second client computing device in a third workspace;
- identifying a third device group configuration that is associated with the first profile, the third device group configuration being customized for the third workspace; and
- applying the third device group configuration to customize the third workspace.

10. One or more computer storage media storing computer executable instructions which when executed implement a method for managing device group configurations across workspaces based on context, the method comprising:
- gathering, by a service, information about a first workspace, the first workspace including a first client computing device on which the service runs and devices to which the first client computing device is currently connected;
- sending, by the service, the information to a management server;
- retrieving, by the service and from the management server, a first data structure that associates profiles with applications and a second data structure that associates the profiles with device group configurations that are customized for the first workspace based on the information the service sent to the management server;
- when a first application is loaded on the first client computing device in the first workspace, accessing the first data structure to identify a first profile that is associated with the first application;
- accessing the second data structure to identify a first device group configuration that is associated with the first profile;
- applying the first device group configuration to customize the first workspace;
- retrieving, by the service executing on the first client computing device or a second client computing device in a second workspace and from the management server, the first data structure and a third structure that associates the profiles with device group configurations that are customized for the second workspace;
- when the first application is loaded on the first client computing device or the second client computing device in the second workspace, accessing the first data structure to identify the first profile that is associated with the first application;
- accessing the third data structure to identify a second device group configuration that is associated with the first profile; and
- applying the second device group configuration to customize the second workspace.

11. The computer storage media of claim 10, wherein the method further comprises:
- detecting a context change in the first workspace;
- identifying one or more actions associated with the context change; and
- causing the one or more actions to be performed in the first workspace to thereby adjust the first device group configuration.

12. The computer storage media of claim 10, wherein applying the first device group configuration to customize the first workspace comprises interfacing with one or more of:
- a filter driver;
- an embedded controller service; or
- an operating system.

13. The computer storage media of claim 10, wherein the method further comprises:
- notifying the management server of a change in the first workspace; and
- receiving an updated second data structure that associates the profiles with device group configurations that are customized for the changed first workspace.

14. The computer storage media of claim 10, wherein applying the first device group configuration to customize the first workspace comprises one or more of:
- enabling a device of the first workspace;
- disabling a device of the first workspace;
- changing a configuration of a device of the first workspace;
- adjusting a configuration of the first application; or
- changing a system capability of the first client computing device.

15. A client computing device comprising:
- one or more processors; and
- computer storage media storing computer executable instruction which when executed implement a service that is configured to manage device group configurations across workspaces based on context by performing the following:
  - gathering, by a service, information about a first workspace, the first workspace including a first client computing device on which the service runs and a first set of devices to which the first client computing device is currently connected, the information about the first workspace including an identifier of the first workspace;
  - sending, by the service, the information about the first workspace to a management server;
  - receiving, by the service, a first instance of a first data structure that associates profiles with device group configurations, the first instance of the first data structure being customized by the management server based on the information about the first workspace the service sent to the management server;
  - detecting that a first application is running on the first client computing device while the first client computing device is part of the first workspace;
  - determining that the first application is associated with a first profile defined in the first instance of the first data structure;
  - identifying a first device group configuration that is associated with the first profile in the first instance of the first data structure;
  - applying the first device group configuration to customize the first workspace;
  - subsequently gathering, by the service, information about a second workspace, the second workspace including the first client computing device on which the service runs and a second set of device to which the first client computing device is currently connected, the information about the second workspace including an identifier of the second workspace;
  - sending, by the service, the information about the second workspace to the management server;
  - receiving, by the service, a second instance of the first data structure that is customized by the management server based on the information about the second workspace the service sent to the management server;

detecting that the first application is running on the first client computing device while the first client computing device is part of the second workspace;

determining that the first application is associated with the first profile defined in the second instance of the first data structure;

identifying a second device group configuration that is associated with the first profile in the second instance of the first data structure; and applying the second device group configuration to customize the second workspace.

16. The client computing device of claim 15, wherein causing the device group configuration to be implemented in the first workspace comprises interfacing with one or more of:

a filter driver;
an embedded controller service; or
an operating system.

* * * * *